United States Patent [19]

Reznik et al.

[11] Patent Number: 5,442,468
[45] Date of Patent: Aug. 15, 1995

[54] APPARATUS FOR PRODUCING COLOR EFFECTS

[75] Inventors: Lev Reznik, Carmiel; Lev Diamant, Korazim; Mordechai Teicher, Kfar Saba, all of Israel

[73] Assignee: Arshach-Applied Science Cars Ltd., Korazin, Israel

[21] Appl. No.: 378,886

[22] Filed: Jan. 23, 1995

Related U.S. Application Data

[63] Continuation of Ser. No. 79,424, Jun. 21, 1993, abandoned.

[51] Int. Cl.⁶ .................. G02F 1/1335; G02F 1/1347
[52] U.S. Cl. ........................................ 359/53; 359/93; 359/498; 359/615
[58] Field of Search .................. 359/53, 498, 93, 94, 359/499, 615, 63

[56] References Cited

U.S. PATENT DOCUMENTS

| Re. 32,521 | 10/1987 | Fergason | 359/53 |
|---|---|---|---|
| 3,204,342 | 9/1965 | Romano | 359/498 |
| 3,218,919 | 11/1965 | Stürner et al. | 359/498 |
| 3,415,590 | 12/1968 | Adler | 359/498 |
| 3,451,751 | 6/1969 | Stock | 359/498 |
| 3,663,089 | 5/1972 | Makas | 359/498 |
| 3,694,054 | 9/1972 | Kirsch | 359/498 |
| 3,971,928 | 7/1976 | Kirsch et al. | 359/498 |
| 4,019,808 | 4/1977 | Scheffer | 359/53 |
| 4,232,948 | 11/1980 | Shanks | 359/53 |
| 4,239,349 | 12/1980 | Scheffer | 359/53 |
| 4,540,243 | 9/1985 | Fergason | 359/53 |
| 4,952,029 | 8/1990 | Hayashi et al. | 359/53 |
| 4,988,167 | 1/1991 | Fergason | 359/63 |
| 5,074,647 | 12/1991 | Fergason et al. | 359/93 |
| 5,107,356 | 4/1992 | Castleberry | 359/93 |
| 5,111,321 | 5/1992 | Patel | 359/93 |
| 5,113,271 | 5/1992 | Fergason | 359/63 |
| 5,243,455 | 9/1993 | Johnson et al. | 359/93 |
| 5,264,951 | 11/1993 | Takanashi et al. | 359/53 |
| 5,381,253 | 1/1995 | Sharp et al. | 359/53 |

Primary Examiner—Martin Lerner
Attorney, Agent, or Firm—Benjamin J. Barish

[57] ABSTRACT

Apparatus for producing color effects includes a source of polychromatic light, a transparent linear-polarizer medium located to receive the polychromatic light and to output linearly polarized light, a transparent phase-rotating dispersive medium located to receive the linearly polarized light and to rotate the angle of polarization thereof as a function of wavelength to thereby produce color separation of the polarized light, and a transparent linear-analyzer medium located to receive the light from the dispersive medium at a selected angle to output a selected color thereof.

8 Claims, 5 Drawing Sheets

5,442,468

APPARATUS FOR PRODUCING COLOR EFFECTS

This application is a continuation of application Ser. No. 08/079,424, filed Jun. 21, 1993, now abandoned.

FIELD AND BACKGROUND OF THE INVENTION

The present invention relates to apparatus for producing color effects by selective color decomposition of polarized white light.

Certain media have the property of rotating the angle of polarization of polarized light as a function of wavelength. When polarized white (polychromatic) light passes through such a dispersive medium, the angle of polarization is rotated as a function of wavelength to thereby produce angular color separation of the polarized light. The white light is thus decomposed to the various colors of the spectrum, for example with the red light characterized by one polarization angle being at one end, and purple light characterized by another polarization angle being at the opposite end of the spectrum. The extent of separation, defined as the relative angle between the polarization angles for the two extremes of the visible spectrum, is dependent on: (1) the material of the dispersive medium; (2) the thickness of the dispersive medium; and (3) when the dispersive medium is anisotropic (having optical properties that differ according to the direction of measurement), also on the relative angle between the incident light polarization and the optical axis of the dispersive medium.

OBJECTS AND BRIEF SUMMARY OF THE INVENTION

An object of the present invention is to exploit the foregoing characteristic of dispersive medium for producing various color effects.

According to the present invention, there is provided apparatus for producing color effects, comprising: a source of polychromatic light; a transparent linear-polarizer medium located to receive the polychromatic light and to output linearly polarized light; a transparent phase-rotating dispersive medium located to receive the linearly polarized light and to rotate the angle of polarization thereof around the axis of propagation of the light as a function of wavelength to produce color-angle separation and thereby a predefined color-angle spectrum of the polarized light; a first liquid crystal cell including electrodes for applying a voltage to the cell, the liquid crystal cell being located to receive the polarized light from the dispersive medium and to rotate the color-angle spectrum thereof around the light propagation axis a desired angle according to the applied voltage; a transparent linear-analyzer medium located to receive the light from the first liquid crystal cell at a selected angle to output a selected color thereof; a second liquid crystal cell aligned with the first liquid crystal cell and the first linear-analyzer medium, and independently controllable by a voltage applied to the second cell; and a second transparent linear-analyzer medium located to receive the light from the second liquid crystal cell and to output a selected brightness according to the voltage applied to the second liquid crystal cell of the selected color according to the voltage applied to the first liquid crystal cell.

According to further features in the described preferred embodiment, the first liquid crystal cell is divided into a plurality of pixels each independently controllable by a voltage applied thereto, enabling the color of each pixel to be selected according to the voltage applied to the respective pixel; and in addition, the second liquid crystal is also divided into a second plurality of pixels aligned with the first-mentioned pixels and independently controllable by a voltage applied to the second plurality of pixels such that the second linear-analyzer medium varies the brightness of each of the second plurality of pixels according to the voltage applied thereto.

It has been found for example that stretched cellophane, commonly used as transparent packaging material, has the above-described phase-rotating and dispersive properties and can therefore be used as the dispersive medium. It is believed that the phase-rotating properties of cellophane film results, at least in part, to the stretching of the film as commonly done in producing such transparent packaging material. Other transparent phase-rotating dispersive media may be used, however, for example stretched BOPP (bi-oriented polypropylene) film and stretched pressure-sensitive adhesive tape sold under the trademark "Scotch" (Reg. TM).

BRIEF DESCRIPTION OF THE DRAWINGS

The invention, together with further features and advantages thereof will be better understood by the description below, taken in conjunction with the accompanying drawings, wherein.

DESCRIPTION OF PREFERRED EMBODIMENTS

The invention is described below with respect to several embodiments to illustrate many of its potential applications, including use as a continuously-variable tunable color filter (e.g., for theater spotlight, color analyzers), as an eye-catching sign or art creation with continuous color changes, and as a color screen, e.g., for television and computer monitors.

Figure 1:
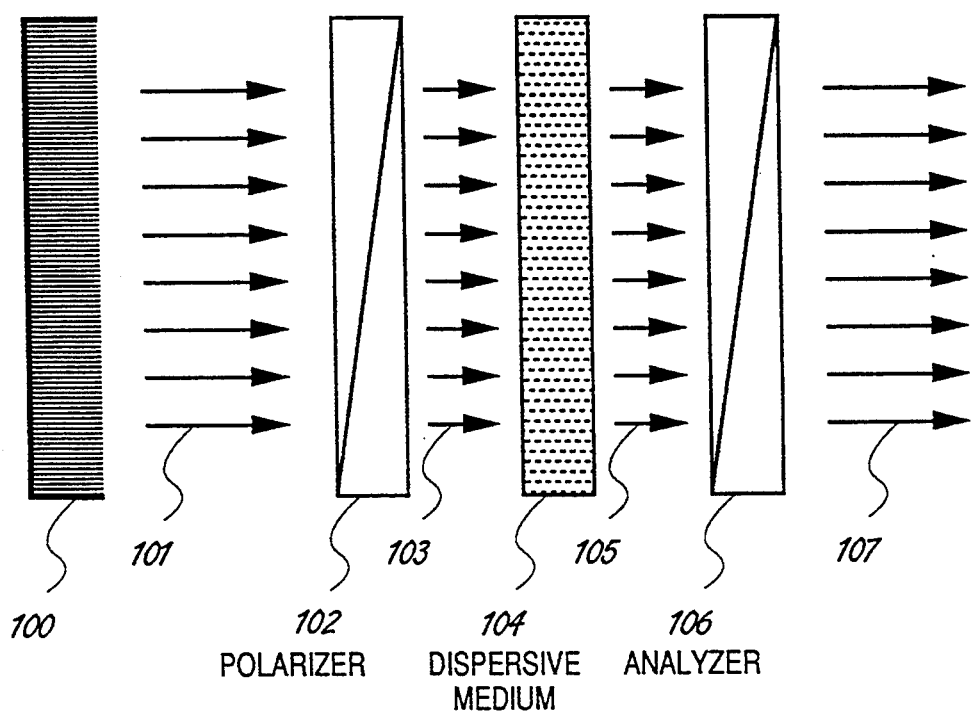
FIG. 1 illustrates the main elements of one form of apparatus constructed in accordance with the present invention.

The Embodiment of FIG. 1

The apparatus illustrated in FIG. 1 includes a light source 100 which emits polychromatic light 101, such as white light, and a transparent linear-polarizer medium 102 located to receive the polychromatic light and to output linearly polarized polychromatic light 103. The apparatus further includes a transparent phase-rotating dispersive medium 104 located to receive the linearly polarized light and to rotate the angle of polarization thereof as a function of wavelength to thereby produce angular color separation of the polarized light, as indicated by arrows 105. A second transparent linear-polarizer medium 106, commonly called a linear-analyzer medium, is located to receive the light 105 from the dispersive medium 104 at a selected angle, and thereby to output a selected color, as indicated by arrows 107.

The phase-rotating dispersive medium 104 thus creates angular color separation of the polarized light 103 received from the linear-polarizer 102; and the analyzer 106 selectively discriminates a specific color which is outputted as shown at 107. The specific color outputted may be selectively varied in a number of manners to produce various color effects, as will be described more particularly below.

A preferred example of material that may be used as the dispersive medium 104 is stretched cellophane film commonly used in commercial packaging. As indicated earlier, it was found that this film has light-dispersive properties in that it rotates the angle of polarization of polarized light as a function of wavelength. Thus, when the polarized light passes through this film, the light becomes spectrally decomposed by the angle of polarization to thereby produce color separation of the polarized light. The analyzer medium 106 which selectively discriminates a specific color, as well as the polarizer medium 102, may be one of the known transparent linear-polarizer media.

In the apparatus illustrated in FIG. 1, the transparent, phase-rotating dispersive medium 104 is homogeneous, such that the outputted light 107 will be a single color as determined by the polarization angle of the linear-analyzer medium 106.

By altering the dispersive medium 104 thickness and orientation, it will be possible to build color filters for different spectral ranges. For example, the light 105 exiting from this dispersive medium may be decomposed in such a way that the difference between polarization directions for red and purple components will be 180°. Rotating the analyzer 106 will change the output light 107 color over the entire visible spectrum range.

Figure 2:
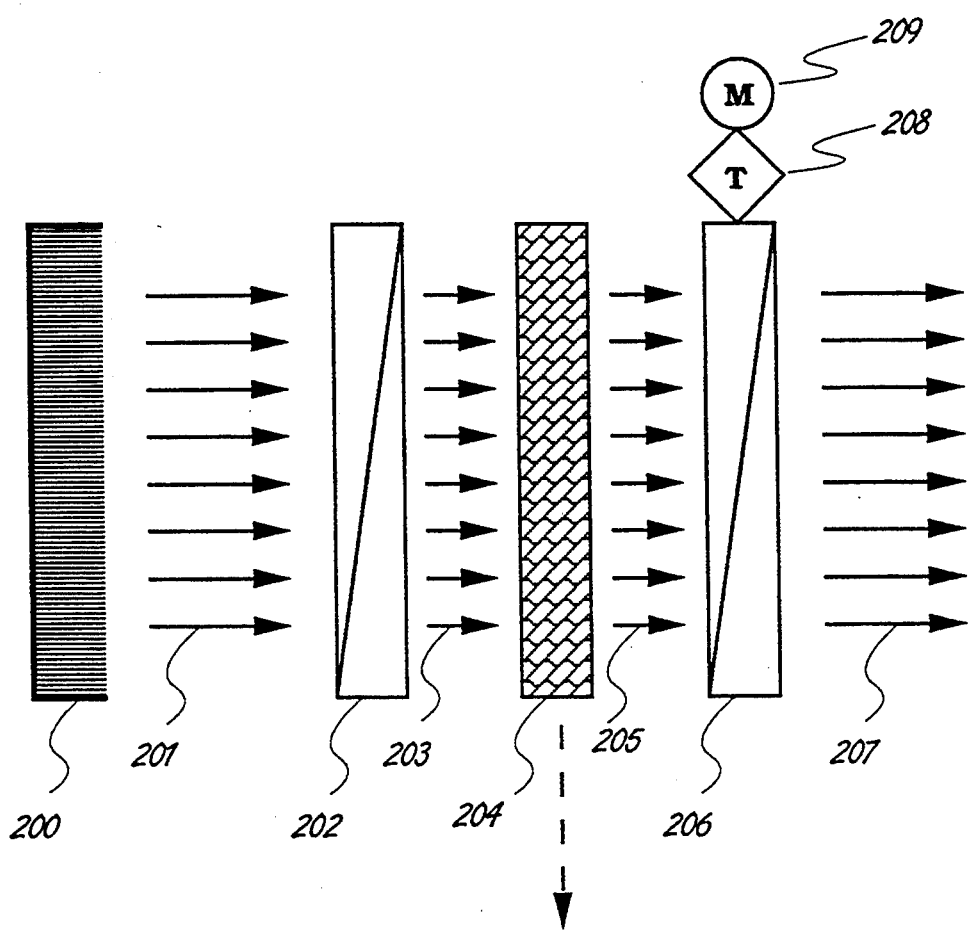
FIG. 2 illustrates the main elements of a second form of apparatus constructed in accordance with the invention, FIG. 2a being a front view of the display in the apparatus of FIG. 2.
Figure 2A:
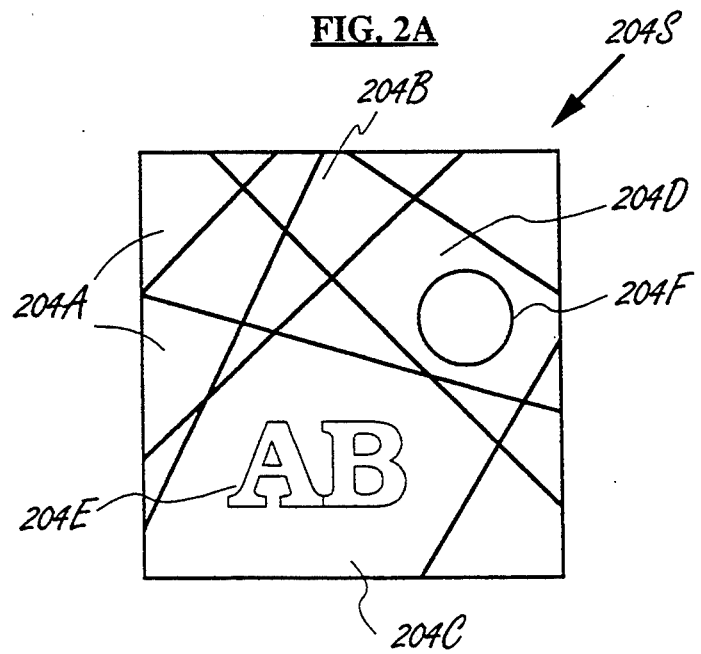

The Embodiment of FIGS. 2 and 2a

FIGS. 2 and 2a illustrate a similar device except that the transparent, phase-rotating dispersive medium, therein designated 204, is heterogeneous, rather than homogeneous, to produce a plurality of selected colors at different segments of the device.

In the example illustrated in FIGS. 2 and 2a, the dispersive medium 204 is made heterogeneous by having a plurality of transparent dispersive elements bonded to each other such that the dispersive medium is of different thicknesses and/or orientations at its different segments. Thus, dispersive medium 204 may be constructed of a base film 204a of stretched cellophane, to which have been bonded a plurality of strips, e.g., 204b, 204c, 204d, as by the use of a pressure-sensitive transparent adhesive. The strips 204b-204d are bonded to the base film 204a in a random or predetermined fashion such that various strips overlie each other and the base film at different locations to thereby produce different thicknesses and/or orientations at different segments of the base film 204a. Since the rotation of the angle of polarization effected by the dispersive medium 204 depends also on the thickness and orientation of the dispersive medium as indicated earlier, it will be seen that the light leaving the dispersive medium 204 will be spectrally decomposed at different segments in different ways.

Thus, the apparatus illustrated in FIGS. 2 and 2a also includes a light source 200 which emits polychromatic light 201, a transparent linear-polarizer medium 202 which receives the polychromatic (non-polarized) light and outputs linearly polarized polychromatic light 203, and a transparent phase-rotating dispsersive medium 204 which receives the linearly-polarized light and rotates its angle of polarization as a function of wavelength, to thereby produce color separation of the polarized light. However, since the dispersive medium 204 is heterogeneous as described above and as illustrated in FIG. 2a, the spectral decomposition by angle of the light 205 leaving medium 204 will be effected to different extents at its different segments corresponding to the different thicknesses and orientations of this medium at its different segments, such that when the light passing through the transparent linear-analyzer medium 206, as shown at 207, will be of different colors at the different segments of medium 204.

FIG. 2 also illustrates an arrangement for physically rotating the analyzer medium 206 so as to change the colors of the light 207 at its different segments, and thereby to produce eye-catching, continuously-changing colored patterns. As shown in FIG. 2, the analyzer 206 is cyclically rotated by a transmission 208 driven by a motor 209. Thus, the light 207 outputted from the analyzer 206, is a collection of continuously-varying colored images corresponding in shape and color-changing behaviour to the shapes and characteristics of the various segments in the dispersive film 204.

The dispersive film 204 may include a segment, indicated at 204e, carrying information whose color is also to change by the rotation of the analyzer medium 206, and another segment, indicated at 204f, whose color does not change during the rotation of the analyzer medium. Both segments 204e and 204f may consist of or include word messages, illustrations of the article being advertised, or other devices used in advertising.

In the example illustrated in FIG. 2a, segment 204e consists of words whose colors are to be changed, in which case these elements would be made of the same dispersive medium material as the other elements of dispersive medium 204 such that the color of this element would depend on its thickness and orientation relative to the thickness and orientation of the other segments of the dispersive medium. However, segment 204f is not intended to change its color upon the rotation of the analyzer 206, but rather to remain of the same color and brightness; in such case, segment 204f would be made of a material which changes the linear polarization to a circular one so that this segment would not change colors and brightness when analyzer 206 is rotated. Thus, segments 204a-204e of the dispersive medium 204 illustrated in FIG. 2a would significantly change in color with the rotation of the analyzer 206, but segment 204f would maintain the same color because of the depolarizing affect of this segment.

Figure 3:
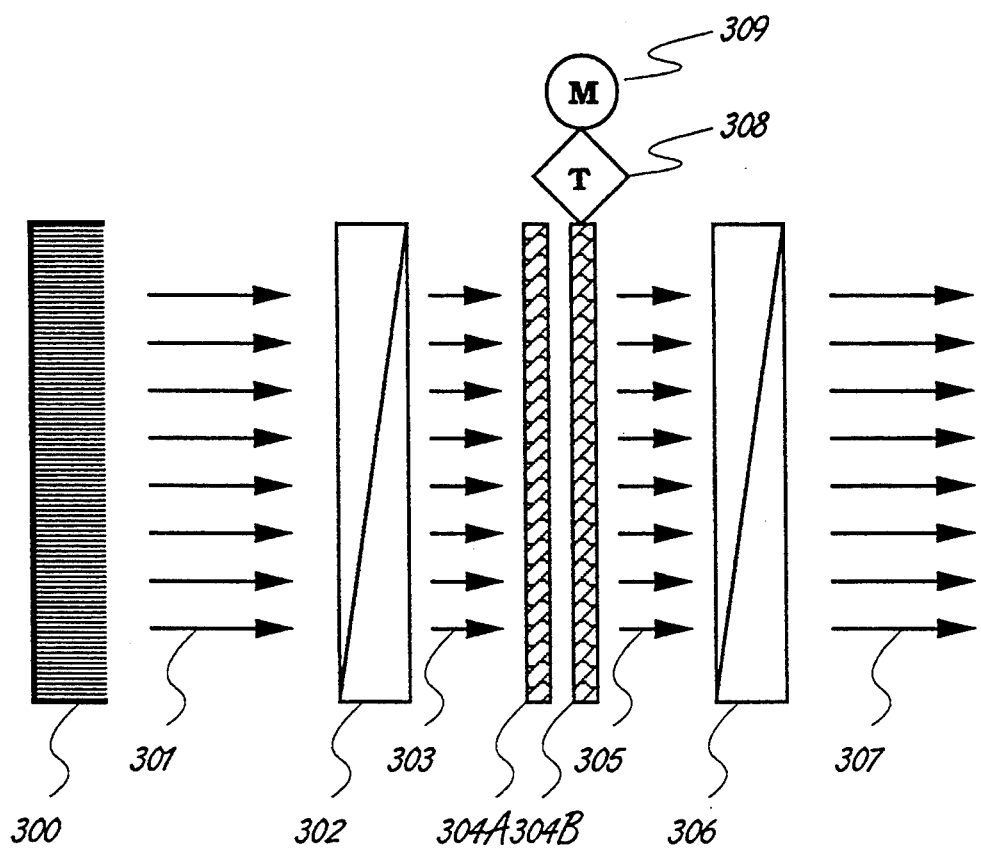
FIG. 3 illustrates the basic elements of a third form of apparatus constructed in accordance with the invention.

The Embodiment of FIG. 3

FIG. 3 illustrates an arrangement which is similar to that of FIG. 2 except that the dispersive medium 304 is constituted of two layers 304a, 304b, in which one of the layers 304b, is movable with respect to the other layer to produce the eye-catching continuously-changing colored patterns.

Thus, the apparatus illustrated in FIG. 3 also includes a source of light 300 outputting polychromatic light 301, a transparent linear-polarizer medium 302 receiving the polychromatic light and outputting linearly polarized light 303, and a transparent phase-rotating dispersive medium rotating the angle of polarization as a function of the wavelength to thereby produce color separation of the polarized light. In this case, however, the dispersive medium is constituted of the two layers 304a, 304b. Both layers 304a and 304b may be of the heterogeneous construction as described above with respect to medium 204 in FIGS. 2 and 2a; one layer 304b is moved by transmission 308 and motor 309 with respect to the other layer 304a, to produce the different color separations in the light 305 outputted from these dispersive layers. The analyzer 306, which receives the light 305 from the dispersive layers 304a and 304b, therefore, need not be rotatable since the changing color patterns appearing in the light 307 outputted from analyzer 306 are produced by moving dispersive layer 304b with respect to layer 304a. If desired, however, analyzer 306 may be rotated also to produce different color effects.

The different color effects can be produced by moving layer 304b in any manner, e.g., rectilinearly, with respect to layer 304a, not only by rotating it with respect to that layer.

Figure 4:
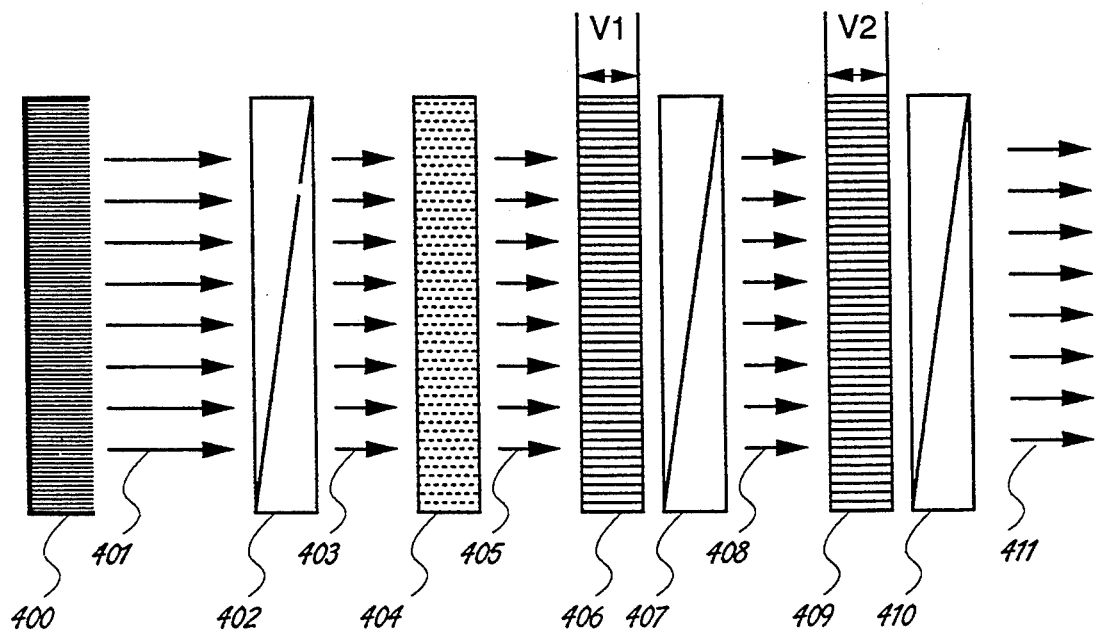
FIG. 4 illustrates the basic elements of an electronically-controllable color display constituting a fourth embodiment of the invention.
Figure 4A:
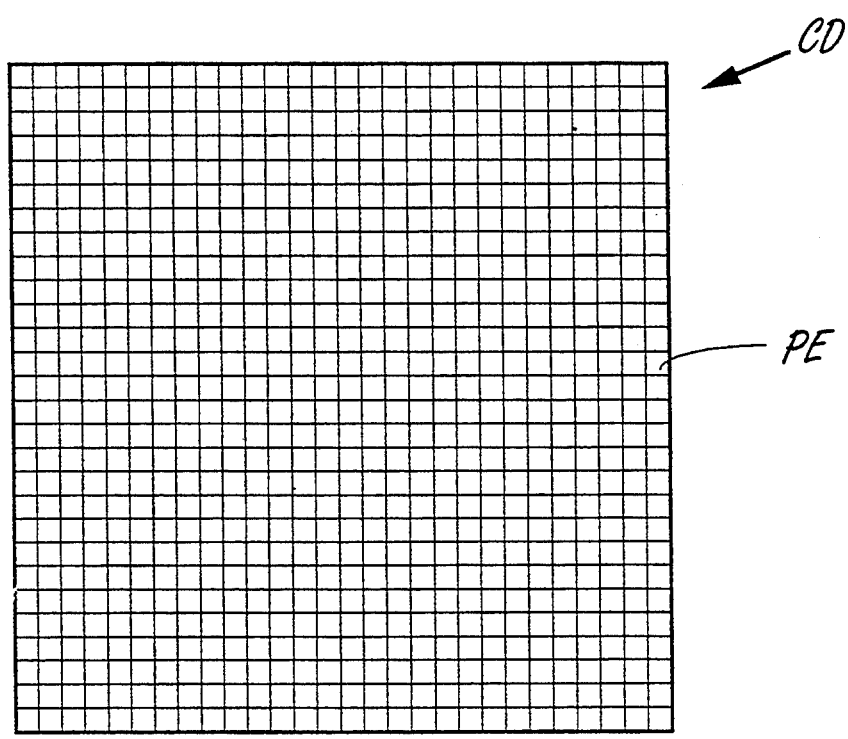
FIG. 4a is a front view of the display of FIG. 4 illustrating the matrix of pixels incorporated in the display of FIG. 4.

The Embodiment of FIGS. 4 and 4a

Whereas FIG. 1 illustrates apparatus which may be used as a continuously-variable tunable colour filter (e.g., for theater spotlight, color analyzers, and the like), and FIGS. 2, 2a and 3 illustrate apparatus which may be used in eye-catching signs and art creations with continuous color changes, FIGS. 4 and 4a illustrate how the invention may also be embodied in color screens, as for simple liquid crystal (LC) indicators, television and computer monitors.

As shown in FIG. 4, this apparatus also includes a light source 400 outputting polychromatic light 401, a transparent linear-polarizer medium 402 outputting linearly polarized light 403, and a transparent phase-rotating dispersive medium 404 which rotates the angle of polarization of the light as a function of wavelength to thereby produce color separation of the polarized light outputted at 405. Elements 400, 402 and 404 in FIG. 4 are thus substantially the same as elements 100, 102 and 104 in FIG. 1.

The apparatus illustrated in FIG. 4, however, further includes a non-dispersive medium 406 receiving the light 405 from the dispersive medium 404. Non-dispersive medium 406 is one which rotates the polarization angle according to an electrical voltage $V_1$ applied to it. Examples of such media are liquid crystal cells. The output of the light from the non-dispersive medium 406 is received by a transparent linear-analyzer medium 407, corresponding to analyzer 106 in FIG. 1, so that the light 408 outputted from analyzer 407 would be discriminated for a specific color corresponding to the voltage $V_1$ applied to the non-dispersive medium 406.

Thus, by dividing the non-dispersive medium 406 (e.g., liquid crystal cell) into a plurality of pixels, each independently controllable by the voltage $V_1$ applied thereto, the color of each pixel can be independently controlled. This is schematically illustrated in FIG. 4a, wherein it will be seen that the apparatus provides a color display CD divided into a matrix of pixels PE, each independently controllable by the voltage $V_1$ applied to the individual pixels constituting the non-dispersive layer 406. It will be appreciated that one or more of the upstream components 400, 402, 404, may also be divided into the matrix of pixel elements PE.

FIG. 4 further illustrates the inclusion of a brightness control arrangement for controlling the brightness of each pixel PE in the color display CD of FIG. 4. For this purpose, the color screen includes another non-dispersive layer 409 receiving the light 408 outputted from the analyzer 407. Non-dispersive layer 409 is also divided into a second matrix of pixels aligned with the pixels of the non-dispersive layer 406, and the pixels of layer 409 are also independently controllable by a voltage $V_2$ applied thereto. A further transparent linear-analyzer medium 410 receives the output of layer 409, such that the output 411 of the display is constituted of the matrix of pixels having colors determined by the voltages $V_1$ applied to the pixels in layers 406, and a brightness determined by the voltage $V_2$ applied to the pixels in layer 409.

Other Possible Variations

The embodiments of the invention as illustrated above are described with respect to "back lit" devices, namely devices in which the polychromatic light (100, 200, 300 or 400) enters the device from the back side, passes through the various layers, and is projected through the front side for viewing by the viewer analogous to "back lit" liquid crystal displays. It will be appreciated, however, that the invention could also be applied with respect to "front lit" devices, similar to "front lit" liquid crystal displays, in which the light enters the device from the front side, passes through the various layers, is reflected back, and then passes again through the various layers for viewing from the front side of the device.

Many other variations, modifications and applications of the invention will be apparent.

What is claimed is:

1. Apparatus for producing color effects, comprising:
a source of polychromatic light;
a transparent linear-polarizer medium located to receive said polychromatic light and to output linearly polarized light;
a transparent phase-rotating dispersive medium located to receive the linearly polarized light and to rotate the angle of polarization thereof around the axis of propagation of the light as a function of wavelength to produce color-angle separation and thereby a predefined color-angle spectrum of the polarized light;
a first liquid crystal cell including electrodes for applying a voltage to the cell, said liquid crystal cell being located to receive said polarized light from the dispersive medium and to rotate said color-angle spectrum thereof around the light propagation axis a desired angle according to said applied voltage;
a transparent linear-analyzer medium located to receive the light from said first liquid crystal cell at a selected angle to output a selected color thereof;
a second liquid crystal cell aligned with said first liquid crystal cell and said first linear-analyzer medium, and independently controllable by a voltage applied to said second cell;
and a second transparent linear-analyzer medium located to receive the light from said second liquid crystal cell and to output a selected brightness according to the voltage applied to said second liquid crystal cell of the selected color according to the voltage applied to said first liquid crystal cell.

2. The apparatus according to claim 1, wherein said first liquid crystal cell is divided into a plurality of pixels each independently controllable by a voltage applied thereto, enabling the color of each pixel to be selected according to the voltage applied to the respective pixel.

3. The apparatus according to claim 2, wherein said second liquid crystal cell is also divided into a second plurality of pixels aligned with said first-mentioned pixels and independently controllable by a voltage applied to said second plurality of pixels such that said second linear-analyzer medium varies the brightness of each of said second plurality of pixels according to the voltage applied thereto.

4. The apparatus according to claim 1, where said phase-rotating, dispersive medium is transparent stretched cellophane.

5. The apparatus according to claim 1, wherein said phase-rotating, dispersive medium is transparent stretched bi-oriented polypropylene.

6. A method for producing color effects, comprising:
passing polychromatic light along a light propagation axis through a transparent linear-polarizer medium to output linearly polarized light;
passing said linearly polarized light through a transparent phase-rotating dispersive medium to rotate the angle of polarization thereof around the axis of propagation of the light according to a function of wavelength to produce color-angle separation and thereby a predefined color-angle spectrum of the polarized light;
passing said polarized light from said dispersive medium through a first liquid crystal cell effective to rotate said color-angle spectrum thereof around the light propagation axis by a selected angle according to a voltage applied to said first liquid crystal cell;
passing the light outputted from said first liquid crystal cell through a transparent linear-analyzer medium outputting a selected color according to the selected angle of said first liquid crystal cell;
passing said light from said transparent linear-analyzer medium through a second liquid crystal cell independently controllable by a voltage applied thereto;
and passing the output of said second liquid crystal cell through a second transparent linear-analyzer medium to output a selected brightness according to the voltage applied to said second liquid crystal cell.

7. The method according to claim 6, wherein said first liquid crystal cell is divided into a plurality of pixels each independently controllable by a voltage applied thereto, enabling the color of each pixel to be selected according to the voltage applied to the respective pixel.

8. The method according to claim 6, wherein said second liquid crystal cell is also divided into a second plurality of pixels aligned with said first-mentioned pixels and independently controllable by a voltage applied to said second plurality of pixels such that said second linear-analyzer medium varies the brightness of each of said second plurality of pixels according to the voltage applied thereto.

* * * * *

UNITED STATES PATENT AND TRADEMARK OFFICE
CERTIFICATE OF CORRECTION

PATENT NO. : 5,442,468
DATED : August 15, 1995
INVENTOR(S) : Lev Reznik, et. al.

It is certified that error appears in the above-indentified patent and that said Letters Patent is hereby corrected as shown below:

Title page, item [75], Inventors: should read--Lev Reznik, Carmiel; Lev Diamant, Korazim, both of Israel--.

Title page, item [73], Assignee: should read--Arshach-Applied Science Labs Ltd., Maof, Korazim, Israel--.

Signed and Sealed this

Twenty-fourth Day of September, 1996

Attest:

BRUCE LEHMAN

Attesting Officer     Commissioner of Patents and Trademarks